UNITED STATES PATENT OFFICE.

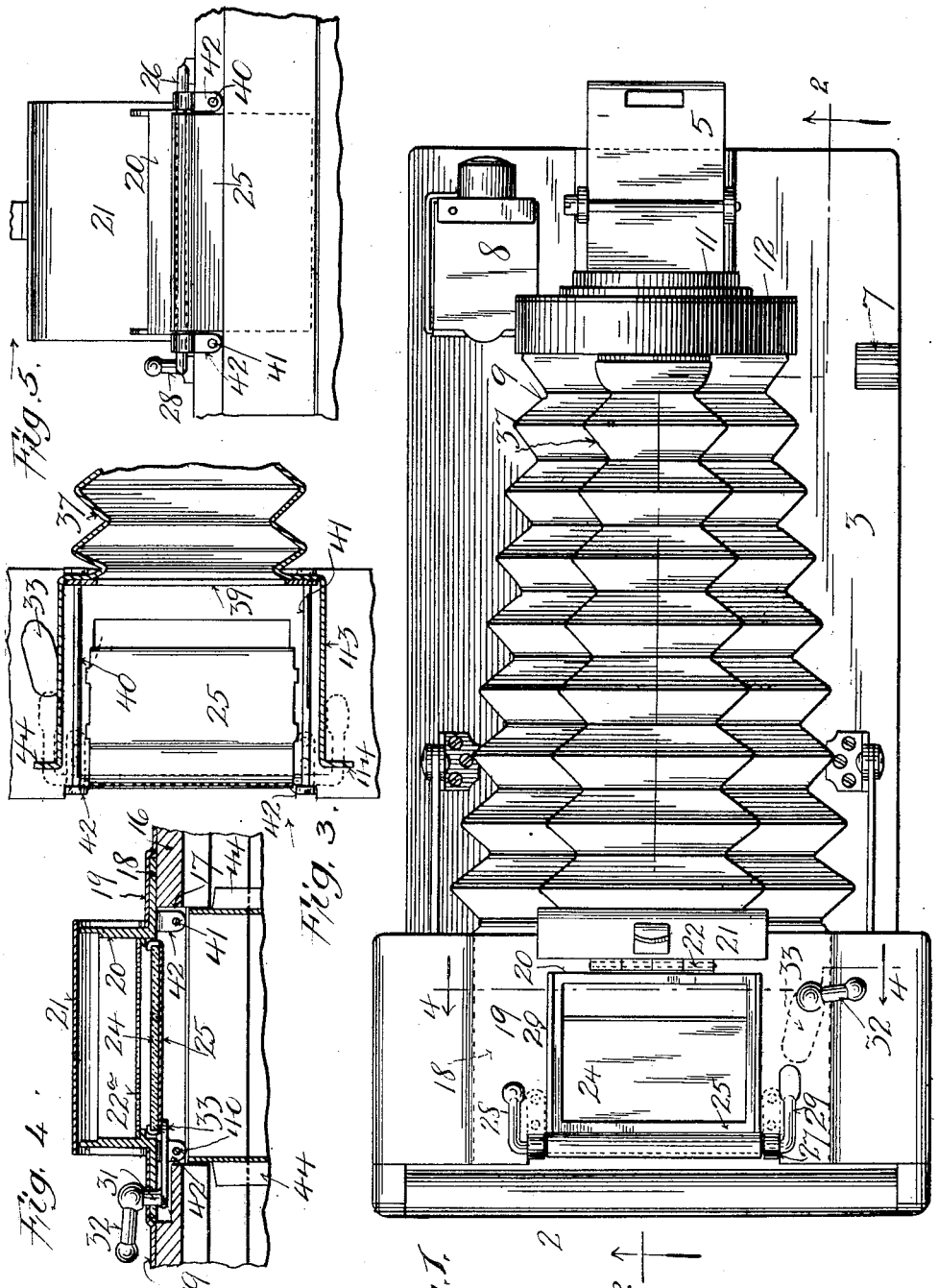

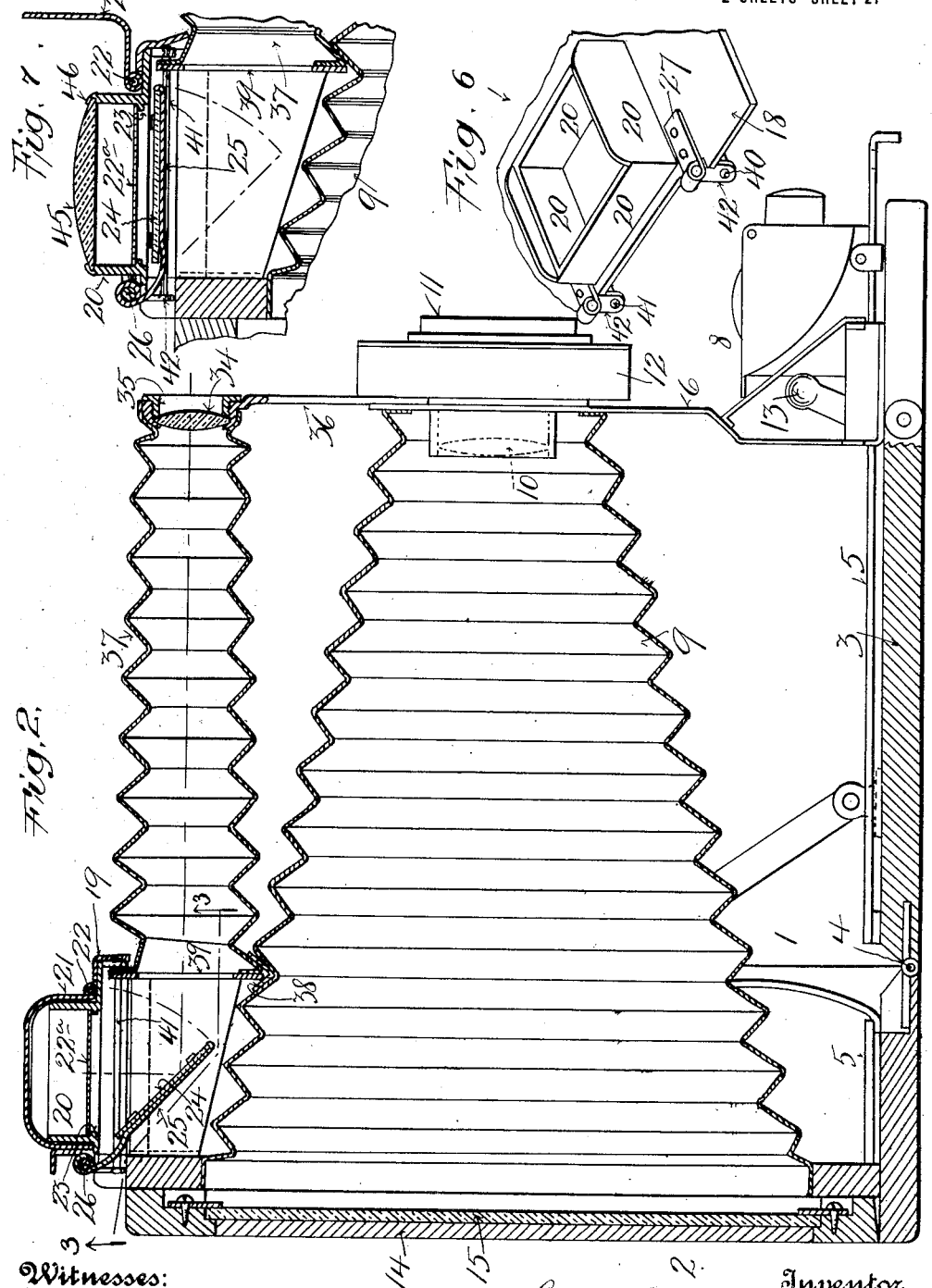

LOUIS F. LEONHARDT, OF NEW YORK, N. Y.

CAMERA.

1,148,911.     Specification of Letters Patent.     Patented Aug. 3, 1915.

Application filed February 12, 1915. Serial No. 7,677.

*To all whom it may concern:*

Be it known that I, LOUIS F. LEONHARDT, a citizen of the United States, and a resident of the city, county, and State of New York, have invented certain new and useful Improvements in Cameras, of which the following is a specification.

My invention relates to cameras and more particularly to cameras having a device for focusing without having to use the lens of the camera through which the photograph is taken.

My invention relates to that class of camera where one lens is used for taking the picture and a separate lens is used for determining the focus.

The object of my invention is to produce a camera of this class which will be very compact and light, which will be very easy to manipulate, and which will be economical in construction.

Another object thereof is to so arrange and adapt the focusing device that it may be embodied in the most compact forms of folding cameras now in use without necessarily increasing their present size or requiring any rearrangement of their parts.

The present invention comprises a camera of the folding as distinguished from the non-folding or box type, having the usual bellows, lens and a back for holding the sensitized medium. In addition, there is a separate bellows, a separate lens, and reflecting and viewing members, the last mentioned bellows and lens being foldable within the camera as the latter is closed. The reflecting member is made to be moved in a manner which will permit the second mentioned bellows to fold in a most compact manner within the camera.

Further advantages will be set forth in connection with the detailed description of the construction and operation of the device.

In the drawings forming part of this application, Figure 1, is a plan view of a camera embodying my invention, showing the bellows extended and the parts in position for photographing, Fig. 2 is a longitudinal sectional view thereof, taken on the line 2—2 of Fig. 1, Fig. 3 is a sectional view, taken on the line 3—3 of Fig. 2, looking in the direction of the arrows, Fig. 4 is a sectional view, taken on the line 4—4 of Fig. 1, looking in the direction of the arrows, Fig. 5 is a rear elevation of parts of the focusing device, Fig. 6 is a perspective view of some of the parts of the focusing device, and Fig. 7 is a vertical sectional view, showing a modified arrangement.

My present invention is adapted to different forms of cameras, but it is of especial advantage when used in the more compact forms of folding cameras because it may be used in such cameras without increasing their size or requiring any rearrangement of the parts. Different cameras have the parts differently arranged, but for convenience I have selected one of the well known forms of camera for showing the application of my invention thereto.

The camera consists, principally, of the box 1, having a back 2 and a drop front 3, the latter being hinged at 4. The back 2 is adapted to be forced backwardly from the box 1 in any well known manner to permit a plate holder to be inserted in front of it. As my present invention necessitates no change in this portion of the camera it is to be understood that instead of the back being adapted for plate or film pack holders, it may be adapted for roll films. The front 3 carries the usual bed 5 on its inner side, which serves to guide the lens support 6. The usual rack and pinion device is indicated at 7 for racking out and in the bed 5 and the lens support 6. The view finder 8, which shows in the drawing, is of the usual type.

The main bellows 9 is of the usual construction for cameras of the folding variety, the rear thereof being secured to the box frame 1 and the forward and smaller end being secured to the lens board.

The usual or photographic lens is shown in dotted lines at 10 in Fig. 2, it being mounted in the lens cups 11 and, in the present showing, consisting of a front and rear combination. The shutter, which is not shown in detail, is contained in the casing 12.

From the description thus far it will be apparent that I have utilized for illustration an ordinary stock camera. When the camera is to be closed up, the finger pieces 13 are pressed to release the lens carrier from the bed; and the carrier is moved back into the box, the bellows 9 is folded therein and the front 3 is swung up to close the box and it is there held by any well known means.

The lens may be focused by operating the rack shaft 7 to move the bed 5, and the lens carrier 6, in and out; and, if the camera is constructed as herein shown, the rear door 14 may be swung open and the focusing observed on the ground glass 15. But it is often desirable to focus the lens without having to look at the rear ground glass 15, especially if the camera is used without a tripod support, or where a roll film holder is used or where no provision is made for temporarily moving the film out of position to permit focusing on the glass 15 or where there would not be time to arrange a plate in position after focusing on the glass 15.

The present invention is intended to provide means for focusing without using the regular photographic lens for the purpose, and to permit the focusing to be observed when the camera is held in the hands. Preferably, the top 16 of the box 1 is recessed or cut away from the rear at 17 to provide space for the parts of the focusing attachment.

There is a frame 18 attached to the top 16 of the camera box and it is preferably partially covered with the leather covering 19 of the camera. This frame comprises a plate 18, and the rectangularly arranged, upstanding walls 20, which latter shade the light from the focusing member or ground glass. There is preferably provided a swinging cap or door 21 which hinges at 22 and which fits around the walls 20 and closes the parts when they are not in use. This door is shown closed in Fig. 2, and it is shown swung open in Figs. 1 and 7.

In the space between the walls 20 and disposed in a plane at right angles to the focusing lens there is arranged a focusing screen 22ª which may consist of ground glass, celluloid or any other material adapted for focusing purposes. This screen is here shown supported upon the lugs 23 stamped from the frame 18.

There is a reflector 24 which may consist of a mirror, carried by a frame or holder 25 which swings at the rear with a hinge rod 26 supported in the brackets 27. The hinge rod has one end projecting beyond the bracket and bent at an angle at 29 so that the extended portion will rest on the outside of the covering 19 and prevent the reflector from dropping below the position shown in Fig. 2; that is, it will hold the reflector at an angle of 45 degrees in relation to the focusing screen. The opposite end of the rod 26 is bent at 28 to an angle which will make it convenient to grasp for the purpose of swinging the reflector upwardly previous to closing the camera. The purpose of the hinge is to render the reflector movable so that it may be either placed at the angle shown in Fig. 2 or be folded up to the position shown in Figs. 4 and 7. There is a lever 31, having one arm 32 exposed at the top of the camera to be grasped and having another arm 33 inclosed and adapted to be moved into and out of the path of the reflector frame 25.

The rays to be reflected upon the focusing screen 22ª first enters the focusing lens 34 which is mounted in a casing 35, carried by an extension 36 on the lens carrier. The focusing lens is moved backwardly and forwardly at the same time and to the same extent as the photographic lens. This focusing lens is preferably arranged in the plane of the nodal point of the photographic lens. This focusing lens may be adjusted by screwing the cup 35 in or out to bring the lens in the plane mentioned.

Though any lens may be used for a focusing lens which is of the same focal length as the photographic lens, nevertheless it is possible to use a very inexpensive lens for this purpose since only a small portion of the subject need be reflected upon the focusing screen and, therefore, only the central or more perfect portion of the lens need be utilized.

The focusing lens is at the outer end of a bellows 37 which is smaller in cross section to the bellows 9. The rear end of this bellows is preferably connected at the bottom to the bellows 9 by a strip 38 which is glued or otherwise secured to both bellows. The rear end of the bellows 37 is secured to a rectangular frame 39 which is guided and supported upon the bars 40, 41, which pass therethrough. These guiding bars are secured at each end in brackets 42, which are stamped and depend from the plate 18.

The parts thus far described do not prevent indirect light from passing to the focusing screen at the sides of the bellows 37 and in order to prevent this I have provided flexible flaps 43 which extend from the rear end of the bellows 37 and at each side thereof, and they have their other and narrower ends 44 secured to the frame of the camera. These flaps, being flexible, permit the bellows 37 to move freely, and when the bellows is in extended position they prevent any extraneous light from entering at the sides and striking the focusing screen.

In Fig. 2 the camera is shown ready for taking a photograph, except that the cap 21 must be swung upwardly to expose to view the focusing screen. The axes of the photographing and focusing lenses being parallel these lenses will project corresponding rays. The light rays will pass through the lens 34 and will pass through the bellows 37 to the upper surface of the reflector 24 which at this time is inclined at an angle to the focusing screen.

The rays strike the reflector and are reflected upon the focusing screen. By looking into the space within the walls 20 the view may be seen reflected on the focusing screen. While the lens 34 is of the same focal length as the photographic lens and capable of projecting a similar view, nevertheless the focusing screen 24 may, as herein shown, be much smaller than the size of the picture area of the plate or film, and for this reason only a portion of the complete view will be reflected upon the focusing screen 24. This will be sufficient, however, if the camera is directed so that the object in the view to be focused on, i. e. the object to be brought out sharpest in the picture, is reflected on the focusing screen. This may be done without particular regard to the final composition of the view.

If the objects reflected on the focusing screen do not appear sufficiently sharp it is obvious that they would not be sharp in the photograph because the rays passing through the focusing lens traverse the same distance before meeting the focusing screen 24 that those which pass through the photographic lens traverse before meeting the plate or film, as the case may be.

If the objects do not appear sufficiently sharp on the focusing screen 24 the shaft 7 is turned to rack the bed 5, and the lens carrier, in or out, as the case may be, until the object appears sharp on the focusing screen. During this racking in or out both lenses move together, so that whatever change takes place on the focusing screen this will indicate the effect which the lens 10 will have on the plate or film. This focusing operation may take place before or after the plate or film has been properly positioned for the exposure. The focusing having been completed the operator proceeds with the taking of the photograph the same as usual. Although the camera may have been positioned, during focusing, with some prominent object in or near the center of the screen, nevertheless, for the exposure the camera may be directed with regard to the composition of the view but with the object focused on in some part of the view. The finder may be used when composing the view, in the usual way.

After the exposure has been made, the camera may be closed by first pressing on the projecting end 28 of the hinge rod to swing the reflector up to the position shown in Figs. 4 and 7, where it will be out of the way of the bellows 37 and the focusing lens. When the reflector has thus been swung upwardly, the lever 31 is turned until the arm 33 engages under the reflector frame 25 to hold the reflector in folded position. The finger pieces 13 are then pressed to release the lens carrier from the bed and the carrier is pushed back into the camera box. This latter operation closes the bellows 9 and the bellows 37. The movement finally causes the frame 39 to slide back along the bars 40, 41, and the entire bellows 37 and the focusing lens will be brought within the camera box and will occupy the space previously occupied by the reflector before the latter was raised into folded position. The bed 3 is then closed and secured in well known manner. To again arrange the camera for use it is only necessary to reverse the above-described operations.

It will be understood from the above that the present invention is applicable to the present forms of folding cameras because the space is most advantageously utilized. The device may be permanently attached to the camera and it is unnecessary to remove it when the camera is folded or closed. The focusing device may be used at any time, regardless of whether the plate or film has been positioned for exposure, so that the focus may be observed up to the moment exposure takes place. The device is simple and inexpensive and easily operated.

In Fig. 7 I have shown a modified arrangement. Herein the parts are the same as previously described except that an enlarging lens 45 is arranged parallel with and above the focusing screen 22$^a$. It is held in place by the turned over edges 46 of the walls 20. Where the enlarging lens is used the view which is reflected upon the focusing screen is transmitted and enlarged by this lens so that the observer sees the objects of the picture about twice as large as where the focusing screen is viewed without the enlarging lens. The only purpose of the lens 45 is to enlarge, the definition being the same as without it.

While I have described in detail one embodiment of my invention I deem all structures as equivalent thereof which come within the scope of the annexed claims.

Having described my invention, what I claim is:

1. A device of the class described, comprising a camera having a photographic lens and a bellows, and a focusing device, comprising a lens and bellows, a focusing screen and a reflector for reflecting the rays from said latter lens upon said focusing screen, said reflector being movably supported whereby it may be moved out of the path of said second bellows to permit the latter to be folded into the camera.

2. A device of the class described, comprising a camera having a photographic lens and a bellows, and a focusing device, comprising a lens and bellows, said lenses being arranged to be moved together, a focusing screen, and a reflector for reflecting the rays from said second lens upon said focusing screen, said reflector being movably supported whereby it may be moved out of the path of said second bellows to permit the latter to be folded into the camera.

3. A device of the class described, comprising a camera having a photographic lens and a bellows, and a focusing device, comprising a lens and a bellows, a focusing screen, and a swinging reflector adapted to be positioned to reflect the rays from said second lens upon said focusing screen and to be swung out of position to permit the said second bellows to be folded into the camera.

4. A device of the class described, comprising a camera having a photographic lens and a bellows, and a focusing device, comprising a lens and a bellows, a focusing screen, and a swinging reflector adapted to be positioned to reflect the rays from said second lens upon said screen and to be swung out of position to permit said second bellows to be folded into the camera and means for holding the reflector in its several positions.

5. A device of the class described, comprising a camera having a photographic lens and a focusing device comprising a focusing lens arranged with its axis parallel with the axis of the photographic lens, a bellows, a focusing screen arranged in a plane at right angle to the said lens axes, a reflector movable into a position to reflect the rays from the focusing lens upon said screen and movable into a position substantially parallel with said screen to permit said bellows to be folded into the camera.

6. A device of the class described, comprising a camera having a photographic lens, and a focusing device comprising a focusing lens arranged with its axis parallel with the axis of the photographic lens, a bellows, a focusing screen arranged in a plane at right angle to the said lens axes and above the path of the bellows, a reflector hinged to swing from an axis to the rear and above the path of the bellows and movable into a position to reflect the rays from the focusing lens upon said screen and movable into a position substantially parallel with said screen, to permit said bellows to be folded into the camera.

7. A device of the class described, comprising a camera, having a photographic lens, and a focusing device comprising a lens and bellows, a focusing screen and a reflector for reflecting the rays from said latter lens upon said focusing screen, said reflector being movably supported whereby it may be moved out of the path of said bellows to permit the latter to be folded into the camera, and an enlarging glass arranged to receive the rays from said focusing screen for the purpose set forth.

8. A device of the class described, comprising a camera having a photographic lens, and a focusing device comprising a lens and a bellows, a focusing screen, means for guiding said bellows in a plane at right angle to said screen, a movable reflector adapted to reflect the rays from said second lens upon the focusing screen and adapted to be moved out of the path of said bellows.

9. A device of the class described, comprising a camera having a photographic lens and a bellows, and a focusing device comprising a lens and a bellows, a focusing screen, means for guiding said bellows in a plane at right angle to said screen, said second mentioned bellows having its rear end connected to said first mentioned bellows at a point between the ends of the latter, a movable reflector adapted to reflect the rays from said second lens upon the focusing screen and adapted to be moved out of the path of said second mentioned bellows.

10. A device of the class described, comprising a camera having a photographic lens, and a focusing device comprising a lens, a bellows having a frame at the rear end thereof, guiding rods supporting and guiding said frame, a focusing screen, a movable reflector adapted to reflect the rays from said second lens upon the focusing screen and adapted to be moved out of the path of said bellows.

11. A device of the class described, comprising a camera having a photographic lens and a bellows, and a focusing device comprising a focusing screen of smaller dimensions than the projecting area of the photographic lens, a single lens arranged in the plane of the nodal point of the photographic lens and arranged to be moved with the photographic lens, and a reflector adapted to reflect the rays from said second lens upon said screen.

Signed at the city, county and State of New York this 9th day of February, 1915.

LOUIS F. LEONHARDT.

Witnesses:
CHARLES G. HENSLEY,
HARRY A. NADEL.